US008596706B2

(12) United States Patent
McGuire et al.

(10) Patent No.: US 8,596,706 B2
(45) Date of Patent: Dec. 3, 2013

(54) ARTICULATING MEMBERS FOR CLOSURE SYSTEMS

(75) Inventors: Michael E. McGuire, Milford, MI (US); Charles C. Weddle, Waterford, MI (US); Shawn G. Quinn, Grand Blanc, MI (US); Scott W. Thorpe, Milford, MI (US); Altaf S. Imam, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 13/415,292

(22) Filed: Mar. 8, 2012

(65) Prior Publication Data

US 2013/0232882 A1 Sep. 12, 2013

(51) Int. Cl.
*B62D 25/10* (2006.01)

(52) U.S. Cl.
USPC .......................................................... 296/76

(58) Field of Classification Search
USPC .......... 296/76, 146.11, 146.12, 155; 292/201, 292/216, 340, 241.16, 251.5, 336.3, 341.16, 292/341.18; 227/19; 49/280; 297/408
See application file for complete search history.

(56) References Cited

U.S. PATENT DOCUMENTS

| | | | | |
|---|---|---|---|---|
| 5,295,720 | A * | 3/1994 | Budde | 292/201 |
| 5,785,364 | A * | 7/1998 | Kleefeldt et al. | 292/201 |
| 6,341,448 | B1 * | 1/2002 | Murray et al. | 49/280 |
| 6,390,516 | B1 * | 5/2002 | Kobayashi | 292/201 |
| 6,540,272 | B2 * | 4/2003 | Spurr | 292/216 |
| 8,348,310 | B2 * | 1/2013 | Vazquez et al. | 292/217 |
| 8,469,440 | B2 * | 6/2013 | Thorpe et al. | 296/146.9 |
| 2010/0117379 | A1 * | 5/2010 | Mitchell et al. | 292/216 |
| 2012/0292927 | A1 * | 11/2012 | Vazquez et al. | 292/200 |
| 2013/0031844 | A1 * | 2/2013 | Quinn et al. | 49/503 |

* cited by examiner

*Primary Examiner* — Kiran B Patel
(74) *Attorney, Agent, or Firm* — Quinn Law Group, PLLC

(57) ABSTRACT

A closure assembly includes a striker assembly and a latch mechanism moveable along a longitudinal path relative to each other. One of the striker assembly and the latch mechanism includes a plate defining a first surface, and the other of the striker assembly and the latch mechanism includes an articulating member defining a second surface moveable into abutting engagement with the first surface of the plate. The articulating member moves into abutting engagement with the plate after the latch mechanism and the striker assembly have moved into a closed position relative to each other to restrict lateral movement between the striker assembly and the latch mechanism relative to the longitudinal path.

16 Claims, 6 Drawing Sheets

ARTICULATING MEMBERS FOR CLOSURE SYSTEMS

TECHNICAL FIELD

The invention generally relates to a closure assembly for securing a moveable panel, such as a lift gate, a decklid, or a hatch, to a structure, such as a body of a vehicle.

BACKGROUND

Vehicles include moveable panels for sealing openings in a body of the vehicle. The moveable panels may include but are not limited to a lift gate for sealing a rear opening of a Sport Utility Vehicle (SUV), a decklid for sealing a trunk space of a sedan, or a hatch for sealing a rear opening of a hatchback. It should be appreciated that the opening and the moveable panel may be located anywhere on the vehicle, and may be positioned in any suitable orientation.

A closure assembly secures the moveable panel relative to the body of the vehicle. The closure assembly includes a striker assembly and a latch mechanism. Typically, the striker assembly is attached to the body, and the latch mechanism is attached to and moveable with the panel. However, the relative positions of the striker assembly and the latch mechanism may be reversed. The striker assembly includes a wire striker, which generally forms a loop. The panel and the latch mechanism move along a path into and out of engagement with the striker assembly. The latch mechanism engages the wire striker of the striker assembly in interlocking engagement to secure the panel relative to the body. The closure assembly must minimize and/or eliminate movement of the panel in a lateral direction relative to the path to prevent undesirable noise, paint chips, etc.

SUMMARY

A closure restraint system is provided. The closure restraint system includes a plate fixedly attached to one of a first structure and a second structure, and an articulating member attached to the other of the first structure and the second structure. The second structure is moveable along a path into a closed position relative to the first structure. The plate includes a first surface, and the articulating member includes a second surface. The second surface of the articulating member is disposed in abutting engagement with the first surface of the plate when the second structure is disposed in the closed position. The first surface and the second surface are oriented relative to each other to wedge against each other in response to movement of the second structure along the path to restrict relative movement between the first structure and the second structure in an x-direction of a plane disposed perpendicular to the path.

A vehicle is also provided. The vehicle includes a body defining an opening, and a panel moveably attached to the body. A closure assembly releasably interconnects the panel and the body. The closure assembly includes a striker assembly attached to one of the body or the panel, and a latch mechanism attached to the other one of the body and the panel. The latch mechanism is moveable relative to the striker assembly along a path into a closed position for engaging the striker assembly. A closure restraint system is configured for restricting movement between the latch mechanism and the striker assembly. The closure restraint system includes a first plate and a second plate, each fixedly attached to one of the striker assembly and the latch mechanism. The closure restraint system further includes a first articulating member and a second articulating member, each moveably attached to the other one of the striker assembly and the latch mechanism. The first plate and the second plate each define a first surface, are disposed on opposite sides of the path, and are orientated relative to each other to define an angle therebetween. The first articulating member and the second articulating member each define a second surface, and are disposed on opposite sides of the path. The second surface of the first articulating member is positioned for rotatable movement into abutting engagement with the first surface of the first plate. The second surface of the second articulating member is positioned for rotatable movement into abutting engagement with the first surface of the second plate. When the striker assembly and the latch mechanism are disposed in the closed position, the first articulating member and the second articulating member are moveable into abutting engagement with the first plate and the second plate respectively to restrict relative movement between the striker assembly and the latch mechanism in an x-direction along a plane disposed perpendicular to the path.

Accordingly, the closure restraint system limits relative movement between the latch mechanism and the striker assembly, and thereby limits movement of the components they are attached to, e.g., the body and the panel. The first and second articulating members only move into abutting engagement with the first and second plates respectively after the latch mechanism is disposed in the closed position, thereby not increasing or otherwise affecting the closing resistance of the panel. The abutting engagement between the first plate and the first articulating member, as well as the second plate and the second articulating member, restrict lateral movement of the panel relative to the body after the panel is closed, which reduces undesirable noise, vibration and paint chips therebetween.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as “above,” “below,” “upward,” “downward,”

"top," "bottom," etc., are used descriptively for the figures, and do not represent limitations on the scope of the invention, as defined by the appended claims.

Figure 1:
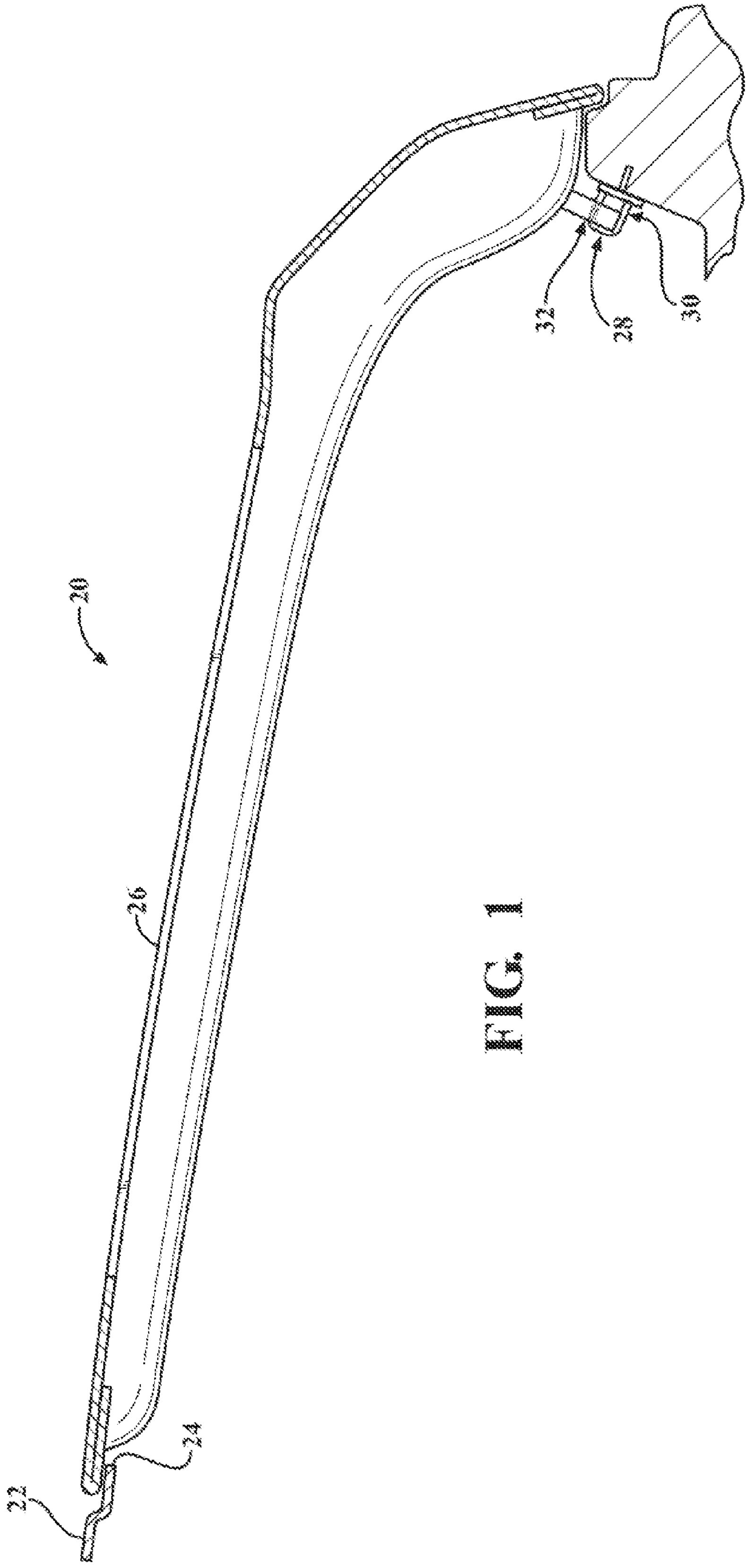
FIG. 1 is a schematic cross sectional view of a vehicle.

Referring to the Figures, wherein like numerals indicate like parts throughout the several views, a vehicle is generally shown at 20. Referring to FIG. 1, the vehicle 20 includes a structure, i.e., a body 22, which defines an opening 24. The body 22 of the vehicle 20 may alternatively be referred to herein as a stationary first structure. The opening 24 may include, for example, a rear access to a cargo van or a sport utility vehicle 20, or a trunk to a sedan. It should be appreciated that the opening 24 may be located and oriented in any position on the body 22 of the vehicle 20. A panel 26 is moveably attached to the body 22, for example, by one or more hinges. The panel 26 moves between an open position to allow access to the opening 24, and a closed position to selectively seal the opening 24. The panel 26 may include, for example, a deck lid, a lift gate, a hatch back, a door, or some other closure panel. The panel 26 may alternatively be referred to herein as a moveable second structure.

Figure 3:
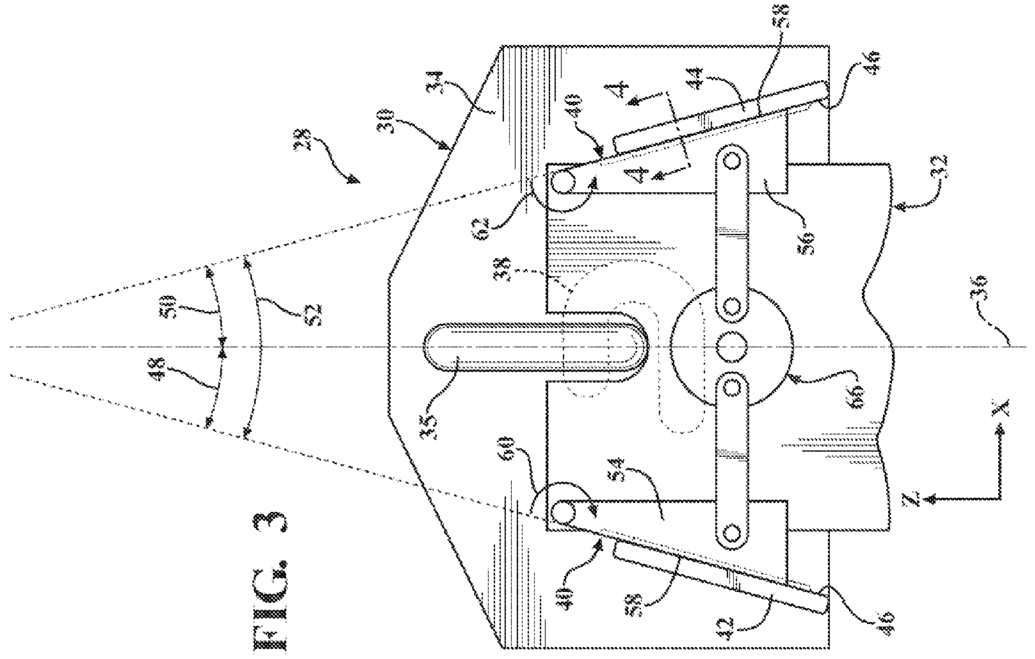
FIG. 3 is a schematic plan view of the closure assembly in a closed position showing the first embodiment of the closure restraint system in an engaged position.
Figure 2:
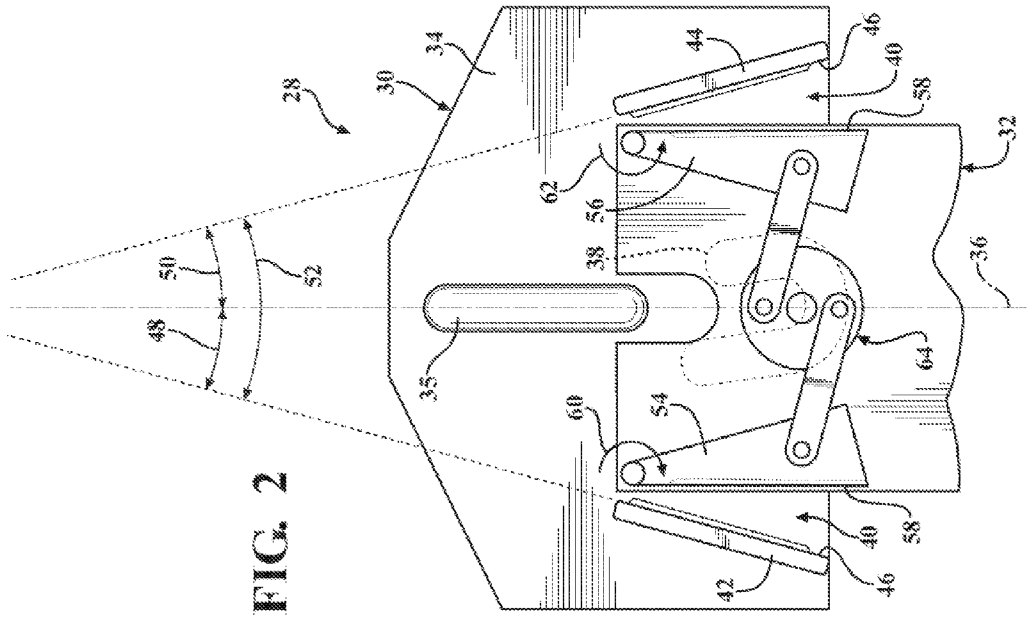
FIG. 2 is a schematic plan view of a closure assembly in an open position showing a first embodiment of a closure restraint system in a disengaged position.

A closure assembly 28 releasably interconnects the panel 26 and the body 22 to secure the panel 26 relative to the body 22 in the closed position. The closure assembly 28 includes a striker assembly 30 and a latch mechanism 32. Referring to FIGS. 2 and 3, the striker assembly 30 includes a base 34 supporting a wire striker 35, with the wire striker 35 fixedly attached to the base 34. Preferably, the striker assembly 30 is attached to the body 22, and the latch mechanism 32 is attached to the panel 26 and moveable relative to the striker assembly 30. However, it should be appreciated that the relative positions of the striker assembly 30 and the latch mechanism 32 may be reversed, with the latch mechanism 32 attached to the body 22, and the striker assembly 30 attached to and moveable with the panel 26 relative to the latch mechanism 32. The wire striker 35 may define a loop as is known. As shown, the latch mechanism 32 moves with the panel 26 along a path 36 relative to the striker assembly 30, and includes an un-latched position, shown in FIG. 2, and a latched position, shown in FIG. 3. When in the un-latched position, the latch mechanism 32 engages the wire striker 35 in interlocking engagement to secure the latch mechanism 32 relative to the striker assembly 30. For example, a lock bolt 38 may rotate around or otherwise grasp the wire striker 35. When the latch mechanism 32 is in the open position, the latch mechanism 32 does not engage the wire striker 35 in interlocking engagement, i.e., the latch mechanism 32, and more specifically the lock bolt 38, is disengaged from the interlocking engagement with the wire striker 35, to allow movement of the latch mechanism 32 and the panel 26 relative to the striker assembly 30 and the body 22. The latch mechanism 32 and striker assembly 30 may include any suitable combination, and/or configuration known to those skilled in the art and/or capable of securely latching the panel 26 to the body 22. Accordingly, the specifics of the striker assembly 30, the latch mechanism 32, and the operation of the interlocking engagement therebetween are not described in detail herein.

Figure 7:
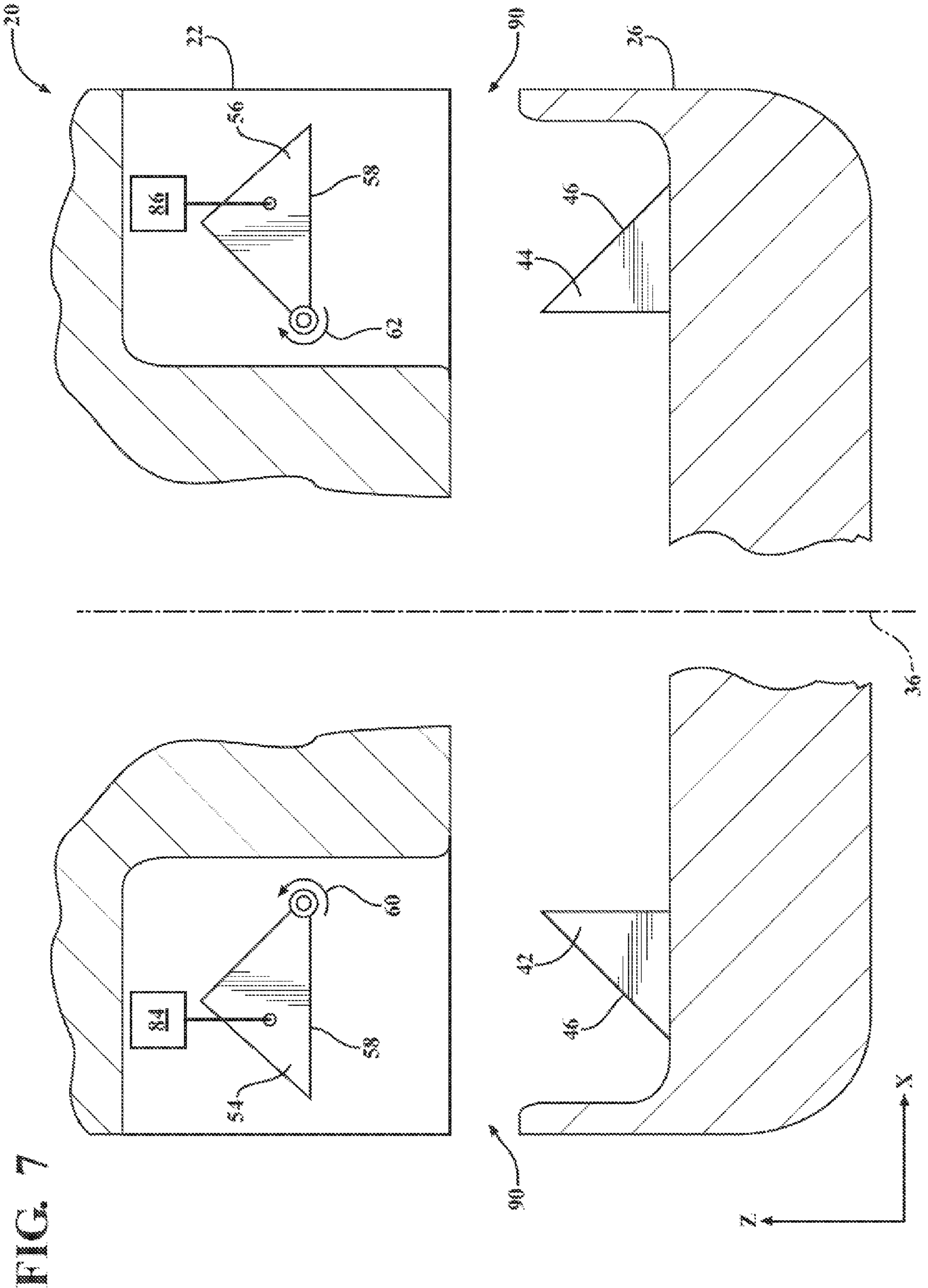
FIG. 7 is a schematic plan view of the vehicle showing a third embodiment of the closure restraint system in the disengaged position.
Figure 8:
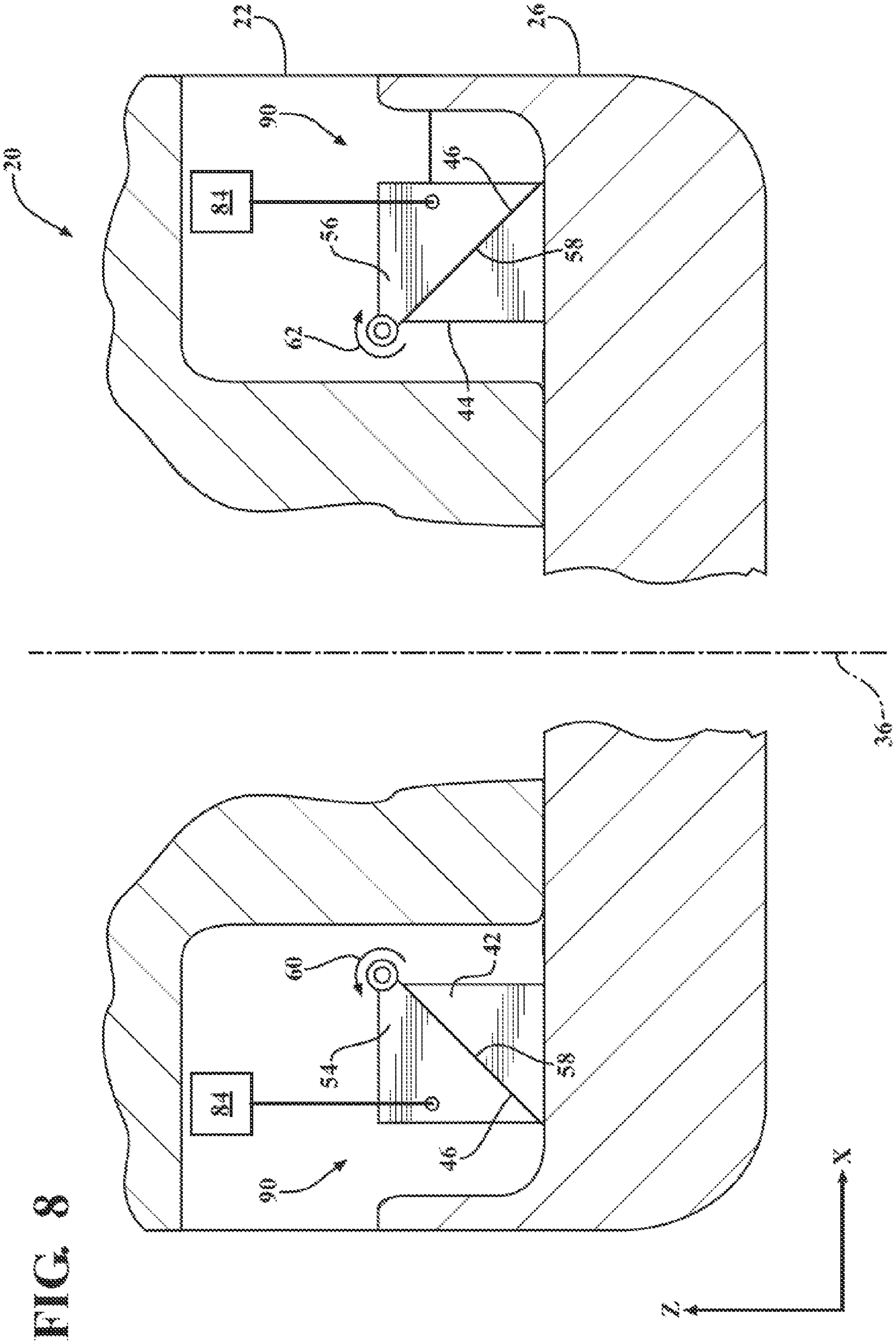
FIG. 8 is a schematic plan view of the vehicle showing the third embodiment of the closure restraint system in the engaged position.

A closure restraint system 40 (described in greater detail below), secures the moveable second structure, such as but not limited to the panel 26, relative to the stationary first structure, such as but not limited to the body 22. As shown in FIGS. 1 through 6, the closure restraint system 40 is integrated into the closure assembly 28. As shown in FIGS. 7 and 8, the closure restraint system 40 is integrated directly into the body 22 and the panel 26 of the vehicle. It should be appreciated that the closure restraint system 40 may integrated into the vehicle 20 at locations other than shown and described herein.

Figure 5:
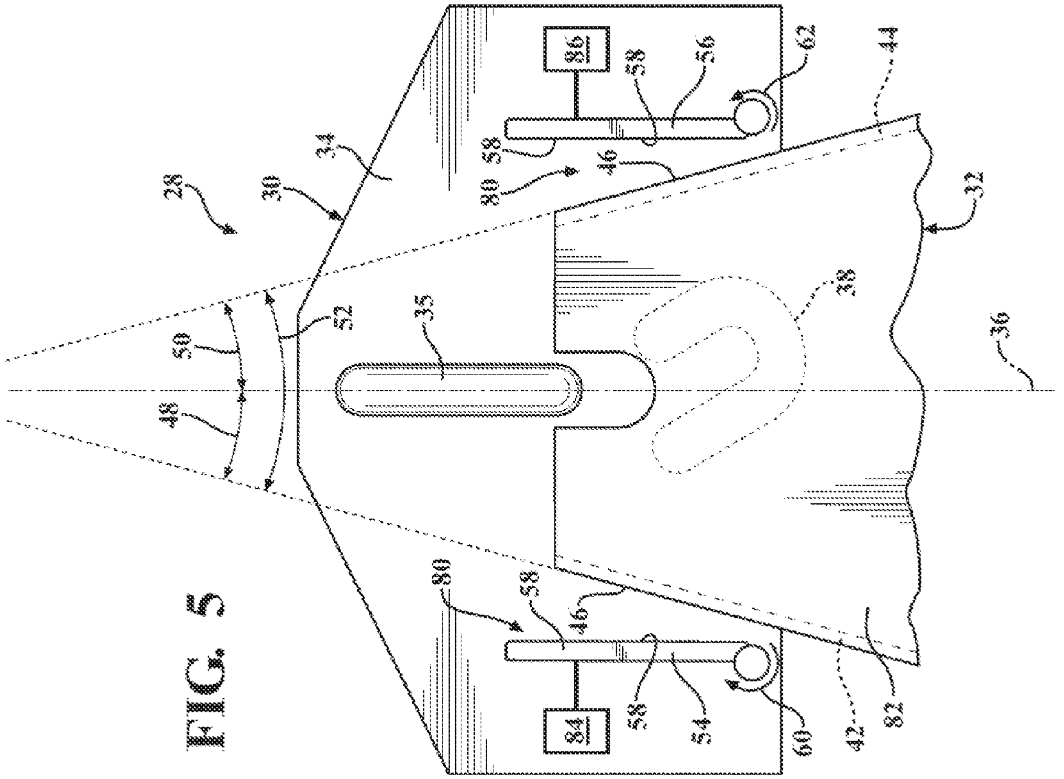
FIG. 5 is a schematic plan view of the closure assembly in the open position showing a second embodiment of the closure restraint system in the disengaged position.
Figure 6:
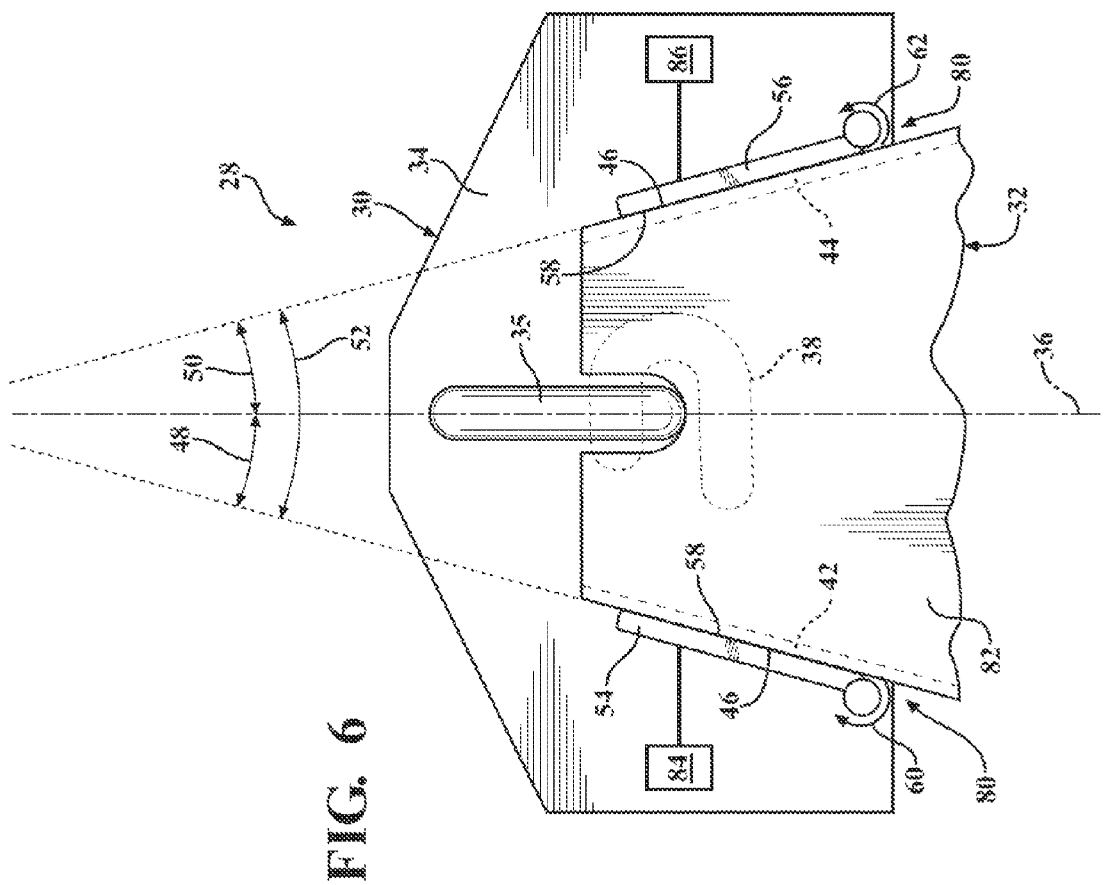
FIG. 6 is a schematic plan view of the closure assembly in the closed position showing the second embodiment of the closure restraint system in the engaged position.

Referring to FIGS. 1 through 6, the closure restraint system 40 is moveable between a disengaged position configured to allow movement between the latch mechanism 32 and the striker assembly 30, shown in FIGS. 2 and 5, and an engaged position configured for restricting movement between the latch mechanism 32 and the striker assembly 30, shown in FIGS. 3 and 6.

The closure restraint system 40 includes plates 42, 44 fixedly attached to one of the striker assembly 30 and the latch mechanism 32, and articulating members 54, 56 moveably attached to the other of the striker assembly 30 and the latch mechanism 32. As shown in FIGS. 2 and 3, the plate 42, 44 includes a first plate 42 and a second plate 44, with each of the first plate 42 and the second plate 44 fixedly attached to and disposed on the striker assembly 30. More specifically, the first plate 42 and the second plate 44 are attached to the base 34 of the striker assembly 30. However, as shown in FIGS. 5 and 6, the first plate 42 and the second plate 44 may alternatively be fixedly attached to and/or integrally formed with the latch mechanism 32. While the exemplary embodiments shown and described herein include two plates 42, 44, it should be appreciated that the closure restraint system 40 may be configured with any number of plates.

Each of the first plate 42 and the second plate 44 define a contact surface, hereinafter referred to as a first surface 46. The first surface 46 of the first plate 42 and the first surface 46 of the second plate 44 are positioned relative to the path 36 to define an angle therebetween. An angle 48 between the first surface 46 of the first plate 42 and the path 36 is preferably equal to an angle 50 between the first surface 46 of the second plate 44 and the path 36. Preferably, the angle 48 between the first surface 46 of the first plate 42 and the path 36, and the angle 50 between the first surface 46 of the second plate 44 and the path 36, are between the range of 0° and 45°. As such, an angle 52 between the first surface 46 of the first plate 42 and the first surface 46 of the second plate 44 is between the range of 0° and 90°.

As shown in FIGS. 2 and 3, the articulating member 54, 56 includes a first articulating member 54 and a second articulating member 56. Each of the first articulating member 54 and the second articulating member 56 are moveably attached to the latch mechanism 32. However, as shown in FIGS. 5 and 6, the first articulating member 54 and the second articulating member 56 may alternatively be moveably attached to the striker assembly 30, with the first plate 42 and the second plate 44 being attached to the latch mechanism 32. While the exemplary embodiments shown and described herein include two articulating members 54, 56, it should be appreciated that the closure restraint system 40 may be configured with any number of articulating members.

The first articulating member 54 and the second articulating member 56 each define a contact surface, hereinafter referred to as a second surface 58. The first articulating member 54 and the second articulating member 56 are disposed on opposite sides of the path 36. The second surface 58 of the first articulating member 54 is positioned for rotatable movement into abutting engagement with the first surface 46 of the first plate 42. The second surface 58 of the second articulating member 56 is positioned for rotatable movement into abutting engagement with the first surface 46 of the second plate 44.

As noted above, the first articulating member 54 and the second articulating member 56 move between a disengaged position, shown in FIGS. 2 and 5, and an engaged position, shown in FIGS. 3 and 6. When in the disengaged position, the first articulating member 54 and the second articulating member 56 are spaced from the first plate 42 and the second plate 44 respectively to allow relative movement between the striker assembly 30 and the latch mechanism 32. When in the engaged position, the first articulating member 54 is disposed in abutting engagement with the first plate 42, and the second articulating member 56 is disposed in abutting engagement with the second plate 44 to restrict relative movement between the striker assembly 30 and the latch mechanism 32. The first articulating member 54 and the second articulating member 56 only move into the engaged position when the latch mechanism 32 is disposed in the closed position. Accordingly, the first articulating member 54 and the second articulating member 56 remain in the disengaged position, continuously spaced from the first plate 42 and the second plate 44 respectively, whenever the latch mechanism 32 and the striker assembly 30 are moving along the path 36 relative to each other.

Figure 4:
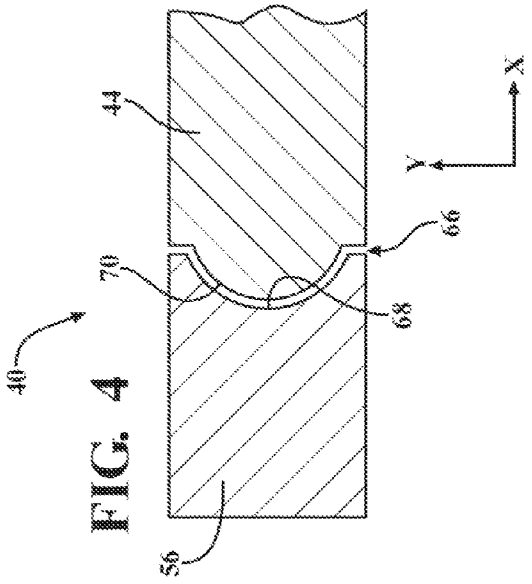
FIG. 4 is a cross sectional view of the closure restraint system taken along cut line 4-4 shown in FIG. 3.

When the closure restraint system 40 is disposed in the engaged position, relative movement between the latch mechanism 32 and the striker assembly 30 is restricted in at least a lateral direction relative to the path 36, i.e., side to side movement along an x-axis of a plane disposed perpendicular to and intersecting the path 36. Accordingly, as shown in FIG. 4, the abutting engagement between the first articulating member 54 and the first plate 42, and the second articulating member 56 and the second plate 44, restrict lateral movement between the latch mechanism 32 and the striker assembly 30 in an x-direction of a plane intersecting and disposed perpendicular to the path 36. Furthermore, when the first plate 42 and the second plate 44 are angled relative to the path 36, the closure restraint system 40 further restricts movement between the striker assembly 30 and the latch mechanism 32 in a direction parallel with the path 36, i.e., in a fore or aft direction or a z-direction of the plane intersecting and disposed perpendicular to the path 36.

When moving from the disengaged position into the engaged position, the first articulating member 54 rotates in a first rotational direction 60 into abutting engagement with the first plate 42. Similarly, when moving from the disengaged position into the engaged position, the second articulating member 56 rotates in a second rotational direction 62 into abutting engagement with the second plate 44. The first rotational direction 60 is opposite the second rotational direction 62. As shown, the first rotational direction 60 is clockwise and the second rotational direction 62 is counterclockwise. However, it should be appreciated that the positions of the first articulating member 54 and the second articulating member 56 relative to the first plate 42 and the second plate 44 respectively may vary from that shown herein, thereby altering the respective direction of rotation for each.

The closure restraint system 40 further includes at least one actuator 64. The actuator 64 is coupled to the each of the first articulating member 54 and the second articulating member 56. The actuator 64 is configured for moving the first articulating member 54 and the second articulating member 56 between the engaged position, i.e., into abutting engagement with the first plate 42 and the second plate 44 respectively, and the disengaged position, i.e., out of abutting engagement and spaced from the first plate 42 and the second plate 44 respectively. The actuator 64 may include but is not limited to an electric motor, a pneumatic motor, a hydraulic motor, or an active material. Furthermore, the actuator 64 may include all controls, linkages, connections, etc., necessary to connect the actuator 64 to each of the first articulating member 54 and the second articulating member 56.

Referring to FIG. 4, the first surface 46 of the first plate 42 and the second surface 58 of the first articulating member 54 may each include corresponding interlocking features 66 in mating engagement with each other when the second surface 58 of the first articulating member 54 is disposed in abutting engagement with the first surface 46 of the first plate 42. Similarly, the first surface 46 of the second plate 44 and the second surface 58 of the second articulating member 56 may each include corresponding interlocking features 66 in mating engagement with each other when the second surface 58 of the second articulating member 56 is disposed in abutting engagement with the first surface 46 of the second plate 44. The engagement between the interlocking features 66 operates to restrict lateral movement of the striker assembly 30 relative to the latch mechanism 32 in a y-direction of the plane intersecting and perpendicular to the path 36. As noted above, the abutting engagement between the first articulating member 54 and the first plate 42, and the second articulating member 56 and the second plate 44, may restrict lateral movement between the latch mechanism 32 and the striker assembly 30 in the x-direction and the y-direction of the plane disposed perpendicular to the path 36. Accordingly, the closure restraint system 40 may be configured to restrict movement between the latch mechanism 32 in all of the x-direction, the y-direction and the z-direction relative to the path 36.

The interlocking features 66 may include any suitable three dimensional shape and/or configuration. For example, the interlocking features 66 may include but are not limited to a partial spherical recess 68 defined by one of the first surface 46 and the second surface 58, and a partial spherical extension 70 defined by the other of the first surface 46 and the second surface 58. The spherical extension 70 is tightly positioned within the spherical recess 68 when the first surface 46 is disposed in abutting engagement with the second surface 58. Alternatively, the interlocking features 66 may include a textured surface disposed on both the first surface 46 and the second surface 58 that restricts movement therebetween through friction.

As noted above, FIGS. 5 and 6 show an alternative arrangement of the closure restraint system, generally shown at 80, in which the first articulating member 54 and the second articulating member 56 are disposed on and rotatably attached to the striker assembly 30, and the first plate 42 and the second plate 44 are disposed on the latch mechanism 32. More specifically, the first plate 42 and the second plate 44 are integrally formed with a case 82 of the latch mechanism 32, such that the first surface 46 of the first plate 42 and the second plate 44 are defined by lateral sides of the case 82. The closure restraint system 80 operates in the same manner as described above, with the second surface 58 of the first articulating member 54 moving into abutting engagement with the first surface 46 of the first plate 42, and the second surface 58 of the second articulating member 56 moving into abutting engagement with the first surface 46 of the second plate 44 to restrict movement between the latch mechanism 32 and the striker plate 42, 44 when in the closed position. The closure restraint system 80 includes a first actuator 84 coupled to the first articulating member 54, and a second actuator 86 coupled to the second articulating member 56.

Referring to FIGS. 7 and 8 an alternative arrangement of the closure restraint system is generally shown at 90, in which the first articulating member 54 and the second articulating member 56 are disposed on and rotatably attached to opposing lateral sides of the body 22 of the vehicle 20, i.e., the stationary first structure; and the first plate 42 and the second plate 44 are disposed on opposing lateral sides of the panel 26, i.e., the moveable second structure. FIG. 7 shows the panel 26 in the open position relative to the body 22 with the closure restraint system 90 in the disengaged position, while FIG. 8 shows the panel 26 in the closed position relative to the body 22 with the closure restraint system 90 in the engaged position. the closure restraint system 90 operates in the same manner as described above, with the second surface 58 of the first articulating member 54 moving into abutting engagement with the first surface 46 of the first plate 42, and the second surface 58 of the second articulating member 56 moving into abutting engagement with the first surface 46 of the second plate 44 to restrict movement between the body 22 and the panel 26 when in the closed position. The closure restraint system 80 includes a first actuator 84 coupled to the first articulating member 54, and a second actuator 86 coupled to the second articulating member 56.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A closure restraint system comprising:

a plate fixedly attached to one of a first structure and a second structure, and an articulating member attached to the other of the first structure and the second structure;

wherein the second structure is moveable along a path into a closed position relative to the first structure;

wherein the plate includes a first surface, wherein the articulating member includes a second surface disposed in abutting engagement with the first surface of the plate when the second structure is disposed in the closed position; and wherein the first surface and the second surface are oriented relative to each other to wedge against each other in response to movement of the second structure along the path to restrict relative movement between the first structure and the second structure in an x-direction of a plane disposed perpendicular to the path.

2. A closure restraint system as set forth in claim 1 wherein the plate is positioned relative to the path such that the first surface lies along a plane intersecting the path and forming an angle between the plane and the path.

3. A closure restraint system as set forth in claim 2 wherein the angle between the first surface and the path is between the range of 0° and 45°.

4. A closure restraint system as set forth in claim 2 wherein the plate includes a first plate and a second plate, with the first plate and the second plate disposed on opposite sides of the path and angled toward each other to define an angle therebetween.

5. A closure restraint system as set forth in claim 4 wherein the angle between the first plate and the second plate is between the range of 0° and 90°.

6. A closure restraint system as set forth in claim 4 wherein the articulating member includes a first articulating member and a second articulating member, with the first articulating member and the second articulating member disposed on opposite sides of the path, and with the first articulating member positioned for rotatable movement into abutting engagement with the first plate, and the second articulating member positioned for rotatable movement into abutting engagement with the second plate.

7. A closure restraint system as set forth in claim 6 wherein the first articulating member rotates in a first rotational direction into abutting engagement with the first plate, and the second articulating member rotates in a second rotational direction into abutting engagement with the second plate, wherein the first rotational direction is opposite the second rotational direction.

8. A closure restraint system as set forth in claim 1 further comprising an actuator coupled to the articulating member and configured for moving the articulating member into and out of abutting engagement with the plate.

9. A closure restraint system as set forth in claim 8 wherein the actuator includes one of an electric motor, a pneumatic motor, a hydraulic motor, or an active material.

10. A closure restraint system as set forth in claim 1 wherein the first surface of the plate and the second surface of the articulating member each include corresponding interlocking features in mating engagement with each other when the second surface is disposed in abutting engagement with the first surface to restrict lateral movement of the first structure relative to the second structure in both the x-direction and a y-direction of the plane disposed perpendicular to the path.

11. A closure restraint system as set forth in claim 10 wherein the interlocking features include a partial spherical recess defined by one of the first surface and the second surface, and a partial spherical extension defined by the other of the first surface and the second surface, wherein the spherical extension is tightly positioned within the spherical recess when the first surface is disposed in abutting engagement with the second surface.

12. A closure restraint system as set forth in claim 1 wherein the first structure includes one of a striker assembly and a latch mechanism, and the second structure includes the other of the striker assembly and the latch mechanism.

13. A closure restraint system as set forth in claim 12 wherein the articulating member is disposed on and rotatably attached to the latch mechanism, and wherein the plate is disposed on the striker assembly.

14. A closure restraint system as set forth in claim 12 wherein the articulating member is disposed on and rotatably attached to the striker assembly, and wherein the plate is disposed on the latch mechanism.

15. A closure restraint system as set forth in claim 12 wherein:

the striker assembly includes a base and a wire striker fixedly attached to the base; and the latch mechanism includes a latch moveable between a latched position configured for engaging the wire striker in interlocking engagement to secure the latch mechanism relative to the striker assembly when the striker assembly and the latch mechanism are disposed in the closed position, and an un-latched position configured for releasing the wire striker to allow relative movement between the latch mechanism and the striker assembly along the path out of the closed position.

16. A closure restraint system as set forth in claim 1 wherein the first structure includes a body structure of a vehicle, and the second structure includes a moveable panel moveably attached to the body structure.

* * * * *